J. A. PRESTWICH.
INDICATOR FOR GAGING INSTRUMENTS.
APPLICATION FILED AUG. 26, 1914.

1,266,313.

Patented May 14, 1918.
3 SHEETS—SHEET 3.

UNITED STATES PATENT OFFICE.

JOHN ALFRED PRESTWICH, OF TOTTENHAM, LONDON, ENGLAND.

INDICATOR FOR GAGING INSTRUMENTS.

1,266,313.  Specification of Letters Patent.  Patented May 14, 1918.

Application filed August 26, 1914. Serial No. 858,617.

*To all whom it may concern:*

Be it known that I, JOHN ALFRED PRESTWICH, a subject of the King of Great Britain, residing at Northumberland Park, Tottenham, in the county of London, England, engineer, have invented certain new and useful Improvements in or Relating to Indicators for Gaging Instruments, of which the following is a specification.

This invention relates to indicating apparatus which comprises an indicating tube in communication with a chamber having a flexible diaphragm.

I will describe my invention with reference to the accompanying drawings.

Figure 1:
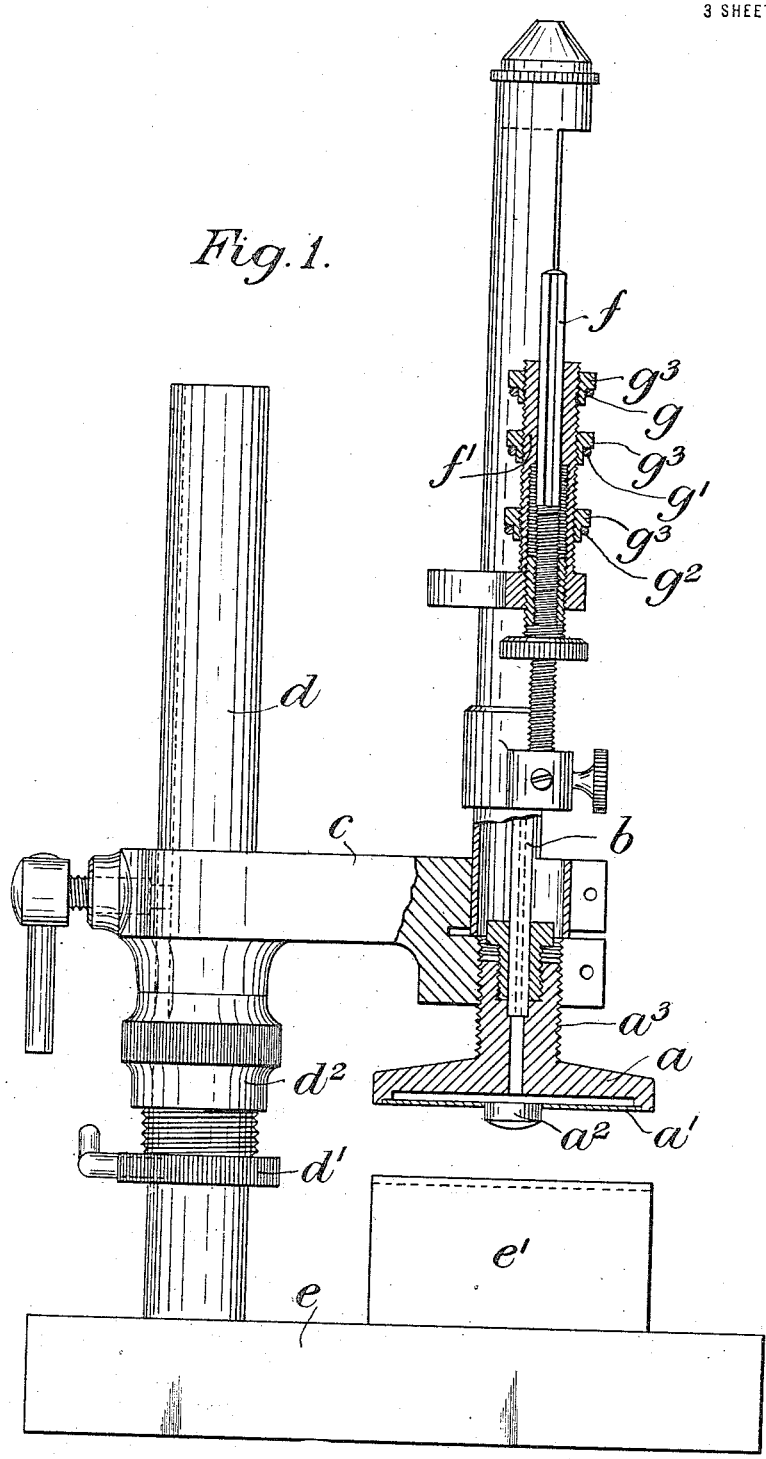
Figure 1 is a view in side elevation partly in section showing one form of apparatus which may be employed as a gage or measuring instrument.
Figure 2:
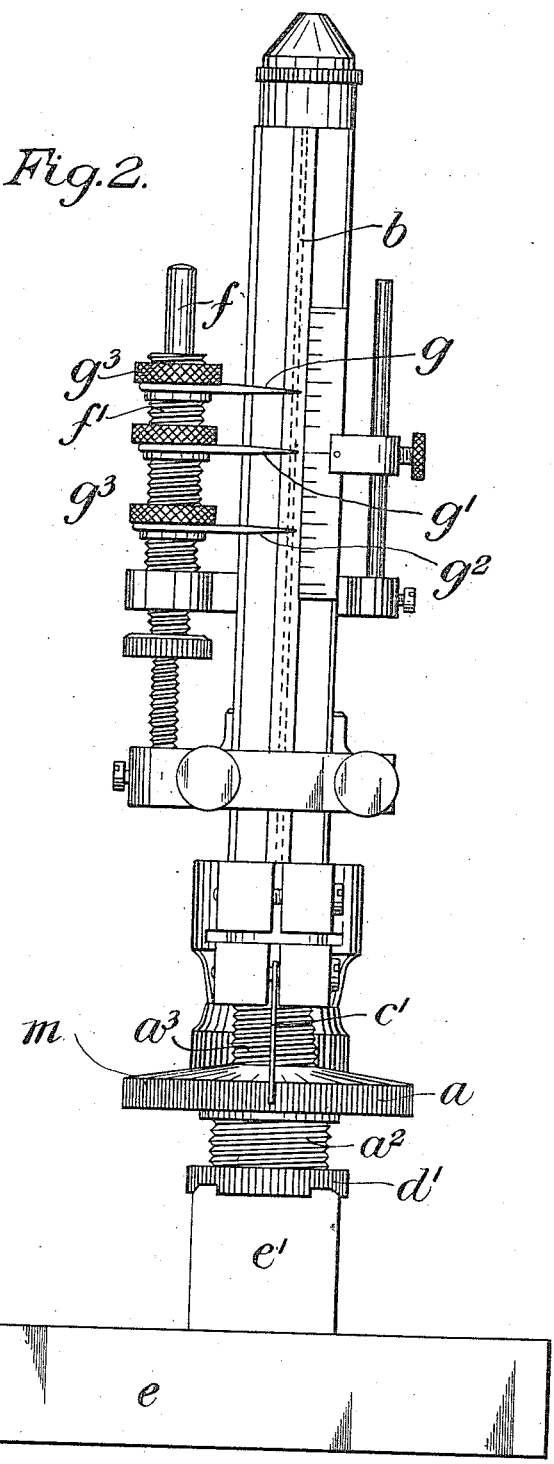
Fig. 2 is a front view thereof.

In the construction shown in Figs. 1 and 2, I provide a circular vessel $a$ adapted to contain fluid, in communication with which vessel is a transparent indicating tube $b$ of small cross section. This apparatus is carried by an arm $c$ which is adjustably mounted on a vertical standard $d$ fixed to a base plate $e$. Immediately under the fluid containing vessel $a$ is a fixed abutment $e'$ fastened to the base plate $e$ and the underside of the fluid containing vessel $a$ is formed of a partially flexible diaphragm $a'$ which diaphragm is preferably provided with a suitable projection $a^2$ at its center.

The diaphragm $a'$ may be corrugated, or may be made of varying thickness to give some increased flexibility if desired, though a flat thin metal diaphragm of even thickness as shown gives good results.

It is preferred to graduate the upper surface of the circular liquid containing vessel $a$ as at $m$ and to provide means for adjustment to and from the fixed abutment $e'$ on the base plate $e$, by a screw $a^3$ working in the arm $c$ which carries the vessel $a$, a fixed pointer $c'$ being situated adjacent to the graduations. A scale may also be provided on the indicating tube.

In proximity to the indicating tube $b$ is preferably provided a device comprising a rod $f$ which is arranged parallel to the indicating tube, and upon which screws a series of pointers $g$ $g'$ $g^2$ which extend to the indicating tube $b$. There are three of these pointers which are both separately adjustable, and also adjustable altogether. The rod $f$ carries a screwed sleeve $f'$ upon which are screwed three nuts $g^3$ $g^3$ and $g^3$ to which are attached the pointers $g$, $g'$ and $g^2$.

In using the apparatus as a gage the lowest pointer $g^2$ is set to indicate the level of the liquid in the tube $b$ and the apparatus is then adjusted with an article of correct size between the diaphragm and the fixed abutment so that the diaphragm $a'$ is pressed upwardly and the level of the liquid rises in the tube $b$. The other two pointers $g$ and $g'$ are then moved so that one is above and the other below the level of the liquid, each being at a suitable distance therefrom which distance depends upon the limits to which it is intended to work. If the total volume of liquid in the apparatus should be decreased or increased by leakage, evaporation, or variation of temperature, the three pointers $g$ $g'$ $g^2$ are lowered or raised together so that the lowest of them indicates the level of the liquid when the diaphragm $a'$ is not being pressed.

When using the apparatus as a gage the fluid containing vessel $a$ is adjusted at a distance from the fixed abutment $e'$ such that when an article of the correct desired dimensions is placed in position on the fixed abutment it will cause by deflection of the diaphragm on the vessel, the liquid to rise to a certain point in the indicating tube. Each subsequent article it is desired to gage is now placed on the abutment and the accuracy of its dimensions can be judged from the level in which the liquid rises in the indicating tube. The fixed abutment may be shaped in any desired manner to facilitate the gaging process.

The instrument may be used for measuring by first placing an article of known dimensions on the abutment $e'$ and adjusting the vessel $a$ so that a certain level of liquid is obtained, and then substituting the article to be measured on the fixed abutment $e'$ and manipulating the screw $a^3$ so that the same level of liquid results, the observation of the amount of rotation of the screw being facilitated by means of the graduations and the fixed pointer. The difference in size of the two articles can be found as in a micrometer gage.

Any suitable fluid may be used and if desired a bead of mercury may be used on top of the fluid in the tube to more clearly indicate the surface of the fluid in the tube.

To avoid having to provide an indicating tube of very fine bore, and to make the fluid more easily visible the tube may be flattened to give the bore an oblong section.

Figure 4:
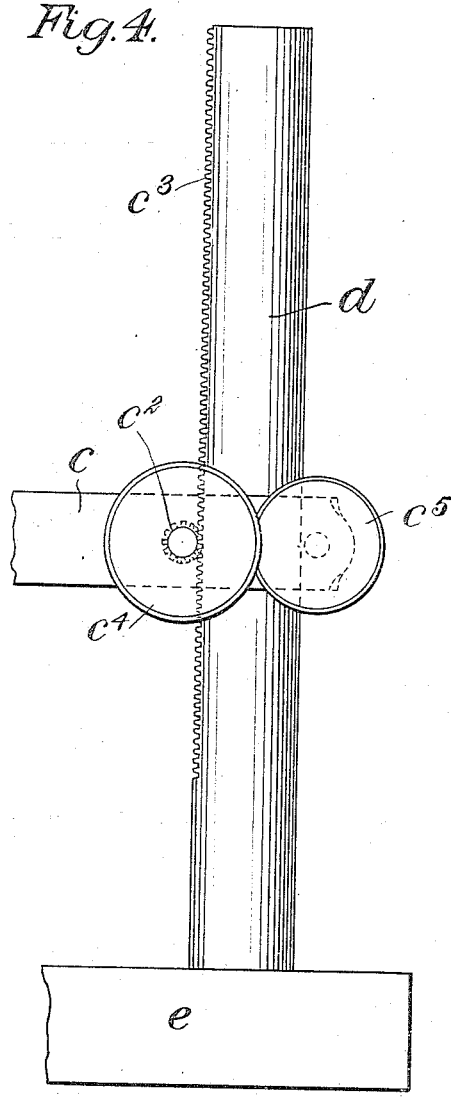
Fig. 4 shows a modification of the apparatus shown in Figs. 1 and 2.

The arm $c$ may be made adjustable on the standard $d$ by a sliding collar $d'$ carrying a screwed sleeve $d^2$. The arm $c$ and the collar $d'$ are each capable of sliding on the standard $d$ and each can be fixed in any desired position by a suitable set screw. When it is desired to move the arm $c$ up or down, the collar $d'$ is moved up until the sleeve $d^2$ abuts against the underside of the boss of the arm $c$. The set screw of the boss of the arm $c$ is then loosened and the set screw of the collar $d'$ tightened. The arm $c$ can then be raised or lowered by screwing the sleeve $d^2$ either up or down. Alternatively, this may be accomplished by rack and pinion or equivalent mechanism as indicated in Fig. 4, in which the pinion $c^2$ is in engagement with the rack $c^3$ formed on the standard $d$, a suitable handle $c^4$ being provided for actuating said pinion, and a locking device $c^5$ for locking the arm $c$ in any desired position.

Figure 3:
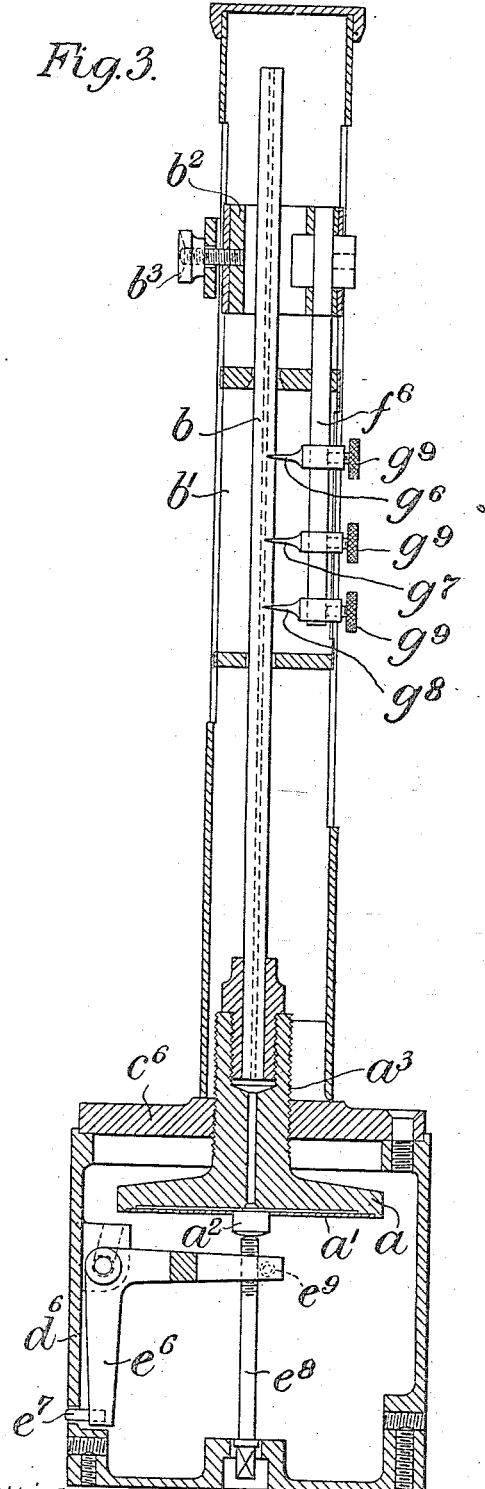
Fig. 3 is a view in side elevation, partly in section of an apparatus suitable for gaging or measuring the internal diameters of cylinders.

In the construction shown in Fig. 3, the vessel $a$ and the tube $b$ are carried by a plate $c^6$ to which is attached a hollow cylinder $d^6$ to the internal surface of which is pivoted a bell crank lever $e^6$. One end of this bell crank lever carries an adjustable pin $e'$ which projects through a hole in the wall of the cylinder $d^6$. The other end of the bell crank lever $e^6$ extends immediately under the diaphragm $a'$ and carries an adjustable screwed rod $e^8$ which is adapted, when the bell crank lever is operated, to come into contact with the projection $a^2$ on the diaphragm $a'$. The other end of the rod $e^8$ extends through the end of the cylinder and terminates in a squared head which can be operated by a wrench. A clamping screw $e^9$ is provided for locking the rod $e^8$ in the bell crank lever $e^6$. The indicating tube $b$ is surrounded by and supported in a guard $b'$. Within the upper part of the guard $b'$ is a slidably mounted member $b^2$ which is held in position by a screw clamp $b^3$. The member $b^2$ carries a rod $f^6$ upon which are adjustably mounted the pointers $g^6$, $g^7$ and $g^8$ each pointer having a set screw $g^9$ to lock it in any desired position. This apparatus is used in a similar manner to that described with reference to Figs. 1 and 2, the cylinder to be gaged or measured being placed over the cylinder $d^6$ so that the pin $e^7$ of the bell crank lever $e^6$ is depressed, and the diaphragm $a'$ thus operated by bell crank lever $e^6$, rod $e^8$ and projection $a^2$.

Additional cylinders or packing pieces or rings may be attached to the outside of cylinder $d^6$ when required.

What I claim and desire to secure by Letters Patent is:—

1. An indicating instrument comprising a body, stationary and movable contact members provided on the body, a movable indicating medium influenced in its movement by the movable contact member, an adjustable supporting member mounted contiguous to the path of movement of the indicating medium, and independently adjustable pointers carried by the said supporting member and arranged for use in determining variations in position of the said indicating medium.

2. An indicating instrument comprising a body, a stationary contact member provided upon said body, a movable contact member mounted upon the body and being yieldably associated with the stationary member, a transparent indicating tube provided upon the body and having one end in communication with one side of the movable contact member, indicating liquid provided within the tube and adapted to have its level affected by movement of the movable contact member, a series of adjustable pointers mounted adjacent to the tube for coöperation with the indicating liquid to determine variations in the level of the latter, a rod for supporting said pointers, means for adjustably mounting said rod, sliding collars on said rod, one for each pointer, and means for adjustably sliding the said collars and pointers separately on said rod.

3. An indicating instrument comprising a body, a stationary contact member disposed on said body, an adjustable supporting member on said body, means for fixing the adjustable supporting member, and a liquid operated contact device for coacting with said contact member, said device including a container, said container being formed with an indicating tube of small bore, a fluid disposed in said container adapted to form a movable indicating medium, and a movable contact member adapted to influence the movement of the fluid in said container, said liquid operated contact device being as a whole threadedly connected to the adjustable supporting member and being adjustable longitudinally of the bore of the tube, on said adjustable supporting member, and independently of an adjustment of said supporting member relative to said body.

4. An indicating instrument comprising a body, a stationary contact member disposed on said body, a container mounted on said body, a diaphragm in said container, a fluid disposed in said container, a contact member secured to said diaphragm, and offset from the face of the diaphragm opposite to the face thereof against which the fluid works, whereby the fluid is adapted to form a movable indicating medium which is influenced in its movement by the movement of the contact member on the diaphragm preliminary to using the instrument for measuring, and means for manually adjusting the diaphragm so as alter the capacity of the container.

5. An indicating instrument comprising a body, a stationary contact member disposed on said body, a container mounted on said body, a diaphragm in said container, a contact member disposed on said diaphragm, a fluid disposed in said container adapted to form a movable indicating medium which is influenced in its movement by the movement of the contact member on the diaphragm, and nut and screw means for preliminarily adjusting the movable contact and container collectively in relation to the fixed contact member to set the instrument for predetermined measuring.

6. An indicating instrument comprising a body, a stationary contact member disposed on said body, an adjustable supporting member on said body, means for fixing the adjustable supporting member, index means, a container mounted on said supporting member, said container being formed with an indicating tube of small bore, a fluid disposed in said container adapted to form a movable indicating medium, a movable contact member adapted to influence the movement of the fluid in said container, and means for adjusting the movable contact member and container collectively in relation to said fixed contact member and to the index means to set the instrument for predetermined measuring, 7. An indicating instrument comprising a body, a stationary contact member disposed on said body, an adjustable supporting member on said body, means for fixing the adjustable supporting member, a container mounted on said supporting member, said container being formed with an indicating tube of small bore, a fluid disposed in said container adapted to form a movable indicating medium, a movable contact member adapted to influence the movement of the fluid in said container, and independently adjustable pointers and scale carried by said supporting members and arranged for use in determining variations in position of the said indicating medium.

In witness whereof, I have hereunto signed my name in the presence of two subscribing witnesses.

JOHN ALFRED PRESTWICH.

Witnesses:
ROBERT MILTON SPEARPOINT,
G. V. SYMES.